Dec. 3, 1968  S. A. SAMA  3,414,247

SYNTHESIS GAS QUENCHER

Filed June 7, 1966  2 Sheets-Sheet 1

SAVERIO A. SAMA
INVENTOR.

BY *J. T. Chaboty*
AGENT

SAVERIO A. SAMA
INVENTOR.

United States Patent Office 3,414,247
Patented Dec. 3, 1968

3,414,247
SYNTHESIS GAS QUENCHER
Saverio A. Sama, Thornwood, N.Y., assignor to Chemical Construction Corporation, New York, N.Y., a corporation of Delaware
Filed June 7, 1966, Ser. No. 555,908
14 Claims. (Cl. 261—118)

ABSTRACT OF THE DISCLOSURE

An apparatus is provided for quenching hot synthesis gas to a lower temperature without the formation of solid free carbon. The hot gas stream is passed downwards through a refractory-lined cylindrical container, which is provided with a central venturi passage in which gas flow is accelerated. The venturi configuration, consisting of a refractory projection with a central opening, divides the container into upper and lower chambers. A metallic lining extends over the inner surface of the refractory lining in the upper chamber, and over the upper surface of the refractory projection. A plurality of ducts are provided to spray a quench liquid into the hot synthesis gas in the upper chamber.

---

Figure 1:
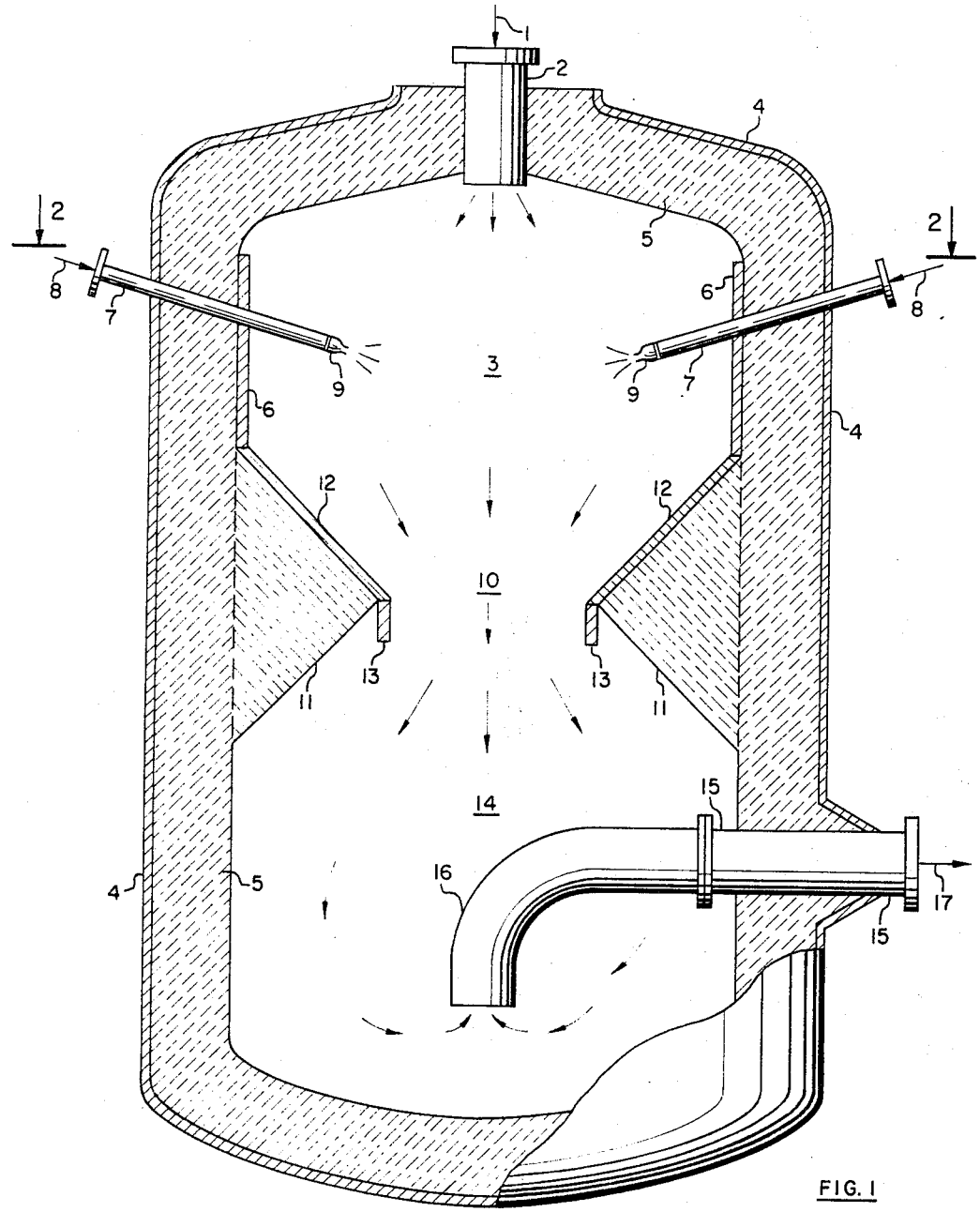

The present invention relates to the quench-cooling of synthesis gas produced by partial oxidation or catalytic steam reforming of fluid hydrocarbons. An improved apparatus is provided for the quenching of hot synthesis gas to a lower temperature level, which attains the rapid cooling of synthesis gas through the carbon forming temperature range while preventing the formation of free carbon.

Synthesis gas consists generally of a mixture of hydrogen and carbon monoxide, together with variable amounts of carbon dioxide and water vapor. Crude synthesis gas is generally produced by the partial oxidation or catalytic steam reforming of a fluid hydrocarbon such as methane or naphtha. The crude synthesis gas is produced at a highly elevated temperature, and the crude gas stream is generally cooled prior to further processing or utilization. Cooling of the gas stream is particularly required when the synthesis gas is to be employed in the catalytic synthesis of methanol, however the gas stream is also cooled prior to further processing such as catalytic reaction of carbon monoxide with steam followed by scrubbing with an alkaline absorbent solution for carbon dioxide removal. These process steps are employed when the product gas stream is to be employed in catalytic ammonia synthesis.

Cooling of the hot synthesis gas has been accomplished in the prior art by passing the hot gas stream through a waste heat boiler, with the concomitant generation of usable steam. A procedure of this nature is described in U.S. Patent No. 2,383,715. One of the disadvantages of this procedure, especially in the case of methanol synthesis gas, is that various reactions tend to occur during gradual cooling of the hot gas stream, with resultant formation and deposition of solid free carbon. Quenching of the hot gas stream within the lower gas exit section of catalyst-filled tubes by injection of quench liquid into the tubes has been suggested in Canadian Patent No. 690,275. This arrangement is objectionable in practice, due to differential thermal stress which may occur if the quench liquid contacts the hot tube surface.

In the present invention, an improved apparatus is provided for the effective quench-cooling of hot synthesis gas through the temperature range over which carbon formation may occur. Rapid and uniform quenching is attained, with resultant gas cooling without the formation of solid free carbon. The hot gas stream is passed downwards through a refractory-lined cylindrical container or vessel, which is provided with a central venturi passage in which gas flow is accelerated. The venturi divides the container into upper and lower chambers, and a quench liquid is sprayed into the hot synthesis gas in the upper chamber. The mixture of synthesis gas and quench liquid droplets flows downwards from the upper chamber and through the venturi throat, and rapid uniform quenching of the hot gas is attained by vaporization of the quench liquid into the gas stream. The resultant quenched gas stream is removed from the lower chamber of the container, preferably by means of a conduit which extends horizontally through the side wall of the container and terminates with an inlet section which curves centrally downwards within the lower chamber. Consequently, additional mixing of the quenched gas is attained and a final quenched gas is produced at a uniform reduced temperature.

The principal advantage of the invention is that rapid quenching of synthesis gas is attained, and that the synthesis gas may be cooled through the temperature range at which carbon formation tends to occur, without the formation of solid free carbon. Another advantage is that the apparatus is readily fabricated and comprises apparatus elements which are not individually complex. Thus, the individual apparatus elements may be readily obtained as standard units. In addition, the synthesis gas stream is uniformly cooled to a reduced temperature. Finally, an advantage is that the quench liquid is thoroughly dispersed and rapidly vaporized into the hot synthesis gas, and no residual liquid phase or entrained liquid droplets are present in the final quenched synthesis gas stream.

It is an object of the present invention to provide an improved apparatus for the quenching of hot synthesis gas.

Another object of the present invention is to provide an apparatus for the quenching of hot synthesis gas which rapidly quenches the gas stream through the carbon-forming temperature range, so that the formation of solid free carbon is effectively prevented.

A further object is to provide an apparatus for the quenching of hot synthesis gas which is readily fabricated and is comprised of relatively simple and inexpensive apparatus elements.

An additional object is to provide an apparatus for the quenching of hot synthesis gas which uniformly and rapidly disperses quench liquid into the gas stream and uniformly quenches the gas stream to a reduced temperature while rapidly vaporizing all of the quench liquid and preventing any entrainment of liquid droplets in the final quench gas stream.

These and other objects and advantages of the present invention will become evident from the description which follows. Referring to the figures, FIGURE 1 is an elevation view of the apparatus, and
FIGURE 2 is a sectional plan view, taken on section 2—2 of FIGURE 1.

Figure 2:
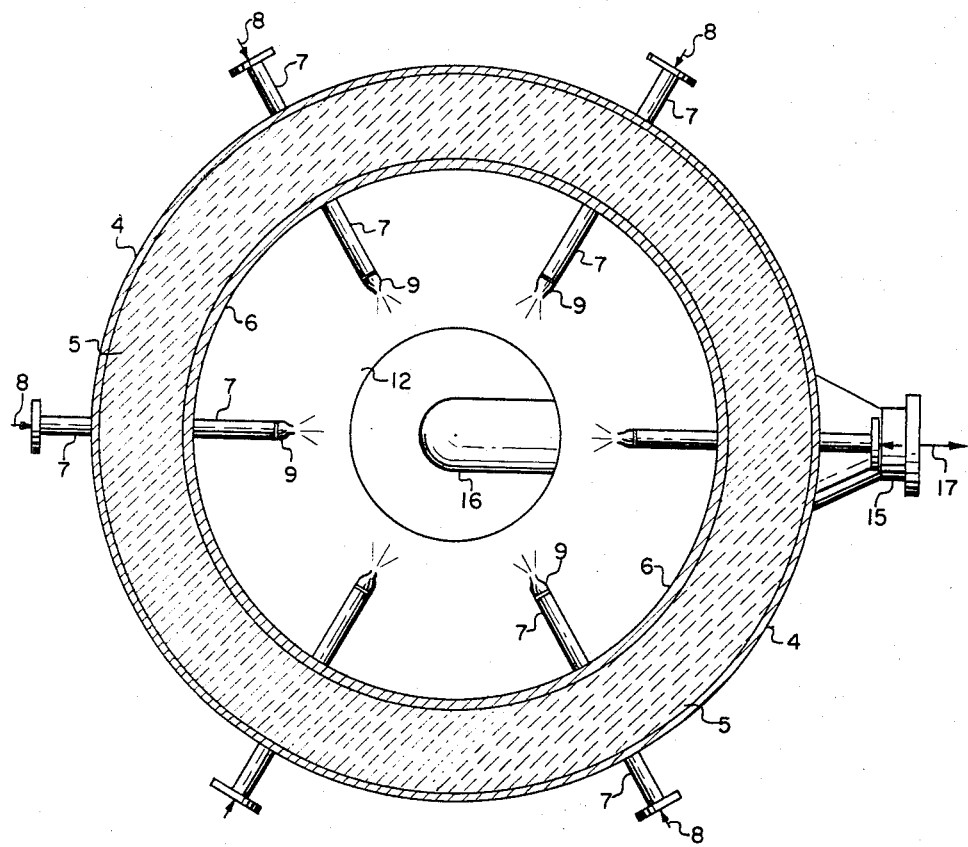

Referring now to FIGURE 1, the hot synthesis gas stream 1 is derived from primary steam reforming or partial oxidation of a fluid hydrocarbon at a highly elevated temperature, and is typically at a temperature above 850° C. Stream 1 is passed via conduit 2 into the upper chamber 3 within the vertically oriented cylindrical container 4, which may be a pressure vessel in instances when stream 1 is produced at elevated pressure. Container 4 is provided with inner refractory lining 5, which consists of a suitable refractory material such as silica, fireclay, kaolin, alumina, sillimanite, magnesite, or silicon carbide. A metallic lining 6 is provided on the inner vertical surface of lining 5 within chamber 3. Lining 6 preferably consists of stainless steel, however other metallic material such as Monel metal or Hastelloy may be employed as a material of construction for lining 6 in suitable instances.

A plurality of ducts 7 are provided for injection of quench liquid into chamber 3. The ducts 7 extend inwards through the side wall of container 4, and also extend through linings 5 and 6. Ducts 7 preferably extend downwards into chamber 3, however ducts 7 may also extend horizontally or even upwards into chamber 3. The quench liquid streams 8 which are passed into ducts 7 preferably consist of water, however other quench liquids may be employed in suitable instances. Thus, the apparatus may be employed in a petroleum refining process, in which case stream 1 could consist of a hydrocarbon vapor stream and streams 8 could consist of liquid hydrocarbons. The liquid quench streams 8 are dispersed into chamber 3 through the outlet openings of ducts 7, which preferably consist of spray nozzles 9. The nozzles 9 are preferably provided with internal vanes, not shown, in order to provide a uniform whirling spray of quench liquid into chamber 3. The quench liquid spray mixes with the hot gas stream 1 within chamber 3, and is at least partially vaporized into the gas stream so as to provide a rapid cooling or quenching effect.

The mixture of hot gas and residual quench liquid droplets now flows downwards through a central venturi passage 10 within container 4, and vaporization of residual liquid droplets in the gas stream takes place with resultant cooling of the gas stream to a desired lower temperature. The central venturi passage 10 is defined by a refractory projection 11 which extends angularly inwards and downwards from the side wall refractory lining 5 to a circular central opening and then extends angularly outwards and downwards from the central opening to the side wall lining 5. A metallic lining 12 is provided over the upper surface of projection 11, and lining 12 may consist of an extension of lining 6. Thus linings 6 and 12 may be provided as a single unitary member of the same metallic material. The lining 12 is preferably provided with a vertically extending conduit section 13, which depends downward from the lower end of lining 12 towards the lower chamber 14 and terminates above the lower end of projection 11.

The quenched gas stream now flows downwards into the lower chamber 14, and suitable means are provided for the removal of the quenched gas stream from chamber 14 to final utilization. The quenched gas is preferably removed from container 4 by the provision of a conduit 15, which extends horizontally through the side wall of container 4 and lining 5, and into chamber 14. The conduit 15 may terminate immediately adjacent to lining 5, however conduit 15 will preferably be provided with an inlet section 16 which curves centrally downward into chamber 14 so as to provide complete gas mixing and a uniform exit gas temperature. The final cooled gas stream 17 removed via conduit 15 will be at a suitable lower temperature level as required, thus in the case of methanol synthesis gas the quenched gas stream 17 is produced at a temperature of 620° C., from an initial synthesis gas stream 1 at a temperature of 850° C. The synthesis gas stream is thus cooled through the carbon formation temperature range of 650° C. to 700° C., without the formation of solid free carbon.

FIGURE 2 is a sectional plan view of FIGURE 1, taken on section 2—2, and shows the radial arrangement of the ducts 7.

Numerous alternatives within the scope of the present invention, besides those mentioned supra, will occur to those skilled in the art. The apparatus is applicable to the quenching of various types of hot synthesis gas, other than methanol synthesis gas. The conduit 13 may be omitted in some instances, and curved conduit section 16 may be omitted in some instances. The inlet conduit 2 may extend horizontally into the upper part of chamber 3. The quenched gas outlet conduit 15 may extend through the bottom of container 4, rather than through the side wall. While projection 11 has been described as being a solid refractory member, projection 11 may also consist of a hollow metallic structural member in some instances, or may be omitted in instances when lining 12 is constructed with sufficient structural rigidity. This latter alternative is relatively less desirable, since additional metallic material and more costly fabrication procedure must be employed.

I claim:

1. An apparatus for quenching hot synthesis gas to a lower temperature without formation of free carbon which comprises a vertically oriented cylindrical container, said container being provided with an inner refractory lining, a refractory projection which extends angularly inwards and downwards from the side wall lining of said container to a central opening, said projection extending angularly outwards and downwards from said central opening to the side wall lining of said container, whereby said projection defines a central venturi passage within said container and divides said container into an upper chamber and a lower chamber, said chambers being connected through said central opening, a vertical metallic lining, said lining extending continuously downwards over the inner vertical surface of said refractory lining in said upper chamber and over the upper inwardly-extending surface of said refractory projection, means to pass hot synthesis gas into said upper chamber within said container, whereby said hot synthesis gas flows downwards through said upper chamber and said central venturi passage and into said lower chamber, a plurality of ducts, said ducts extending radially into said upper chamber through said container side wall and lining above said projection, said ducts terminating within said upper chamber adjacent to said metallic lining and being provided with quench liquid outlet openings, means to pass a quench liquid through said ducts, whereby said quench liquid is projected into the hot synthesis gas in said upper chamber and is vaporized into the hot synthesis gas in said upper chamber and said central venturi passage, and means to remove quenched synthesis gas from said lower chamber.

2. The apparatus of claim 1, in which said metallic lining extends vertically downwards into said lower chamber from said central opening to form a vertical conduit which depends downward from said central opening and terminates above the lower end of said refractory projection.

3. The apparatus of claim 1, in which said ducts extend radially into said upper chamber in a downwards direction.

4. The apparatus of claim 1, in which the quench liquid outlet openings of said ducts within said upper chamber consist of spray nozzles.

5. The apparatus of claim 1, in which said lining consists of stainless steel.

6. The apparatus of claim 1, in which said quench liquid is water.

7. The apparatus of claim 1, in which said means to remove quenched synthesis gas from said lower chamber comprises a conduit which extends horizontally into said lower chamber through the side wall of said container.

8. The apparatus of claim 7, in which said conduit extends horizontally into said lower chamber and terminates with a quenched synthesis gas inlet section which curves centrally downwards within said lower chamber.

9. An apparatus for quenching hot synthesis gas to a lower temperature without formation of free carbon which comprises a vertically oriented cylindrical container, said container being provided with an inner refractory lining, a refractory projection which extends angularly inwards and downwards from the side wall lining of said container to a central opening, said projection extending angularly outwards and downwards from said central opening to the side wall lining of said container, whereby said projection defines a central venturi passage within said container and divides said container into an upper chamber and a lower chamber, said chambers being connected through said central opening, a vertical metallic lining, said lining extending continuously downwards over the inner vertical surface of said refractory lining in said upper chamber and over the upper inwardly-extending surface of said refractory projection, means to pass hot synthesis gas into said upper chamber within said container, whereby said hot synthesis gas flows downwards through said upper chamber and said central venturi passage and into said lower chamber, a plurality of ducts, said ducts extending radially into said upper chamber through said container side wall and lining above said projection, said ducts terminating within said upper chamber adjacent to said metallic lining and being provided with quench liquid outlet openings, means to pass a quench liquid through said ducts, whereby said quench liquid is projected into the hot synthesis gas in said upper chamber and is vaporized into the hot synthesis gas in said upper chamber and said central venturi passage, and a quenched gas outlet conduit, said conduit extending horizontally into said lower chamber through the side wall of said container and terminating with a quenched synthesis gas inlet section which curves centrally downwards within said lower chamber.

10. The apparatus of claim 9, in which said metallic lining extends vertically downwards into said lower chamber from said central opening to form a vertical conduit which depends downward from said central opening and terminates above the lower end of said refractory projection.

11. The apparatus of claim 9, in which said ducts extend radially into said upper chamber in a downwards direction.

12. The apparatus of claim 9, in which the quench liquid outlet openings of said ducts within said upper chamber consist of spray nozzles.

13. The apparatus of claim 9, in which said lining consists of stainless steel.

14. The apparatus of claim 9, in which said quench liquid is water.

References Cited
UNITED STATES PATENTS

| | | | |
|---|---|---|---|
| 757,757 | 4/1904 | Luhne. | |
| 2,656,307 | 10/1953 | Findlay. | |
| 2,781,251 | 2/1957 | Howell | 261—118 XR |
| 3,222,136 | 12/1965 | Hess et al. | 261—118 XR |
| 3,322,412 | 5/1967 | Yueko et al. | 261—128 |

HARRY B. THORNTON, *Primary Examiner.*

TIM R. MILES, *Assistant Examiner.*